May 7, 1957

J. S. BARRETT ET AL 2,791,308

MAGNETIC FIELD RESPONSIVE COUPLING
DEVICE WITH COOLING MEANS

Filed Jan. 2, 1953

INVENTORS.
JOHN S. BARRETT
WILLIAM G. MARTIN, III
PHILIP H. TRICKEY
BY
Clement J. Paynoskar
ATTORNEY.

May 7, 1957     J. S. BARRETT ET AL     2,791,308
MAGNETIC FIELD RESPONSIVE COUPLING
DEVICE WITH COOLING MEANS

Filed Jan. 2, 1953     3 Sheets-Sheet 2

*INVENTORS*
JOHN S. BARRETT
WILLIAM G. MARTIN, III
BY PHILIP H. TRICKEY

ATTORNEY.

United States Patent Office 2,791,308
Patented May 7, 1957

2,791,308

MAGNETIC FIELD RESPONSIVE COUPLING DEVICE WITH COOLING MEANS

John S. Barrett, Glen Echo Park, William G. Martin III, Overland, and Philip H. Trickey, Webster Groves, Mo., assignors to Vickers Incorporated, Detroit, Mich., a corporation of Michigan Application January 2, 1953, Serial No. 329,426

13 Claims. (Cl. 192—113)

This invention relates to power transmission and more particularly to magnetic field responsive torque transmitting devices such as clutches, brakes, dynamometers, etc.

One of the limiting factors of the power capacity of coupling devices, such as clutches, brakes, etc., is the amount of heat that the device can dissipate. In order to increase the heat dissipating capacities of such devices, many expedients have been resorted to to accelerate cooling. The cooling problem is acute in magnetic particle couplings in that such devices are substantially enclosed and generally susceptible to cooling only by ambient atmosphere and air forced across the outer member of the device. Because of the complexities involved circulating fluid coolants have been more or less by-passed in torque transmission designs employing magnetic particles.

The present invention contemplates coupling structure employing a novel system of passages within the coupling members for circulating a fluid coolant therethrough.

In accordance with a preferred embodiment of the invention a magnetic particle coupling device is provided with a coupling member having a plurality of annular channels in each of which is disposed an energizing coil and a coolant conduit concentric with the coil, the conduits being inter-connected to form a continuous labyrinthine passage for receiving a fluid coolant from a circulating system.

It is, therefore, an object of this invention to provide a novel coupling device having a cooling system.

Another object of the invention is to provide a novel cooling system for magnetic field responsive coupling devices.

Another object is to provide a novel coupling device with a coupling member having a separately prefabricated cooling jacket.

A further object of the invention is to provide a coupling member in a coupling device with an internal labyrinthine cooling passage having its inlet and outlet at the same end of the coupling member.

Further objects and advantages of the present invention will be apparent from the following description, reference being had to the accompanying drawings wherein a preferred form of the present invention is clearly shown.

It should be noted that a different scale is used in each view of the drawings.

Figure 1:
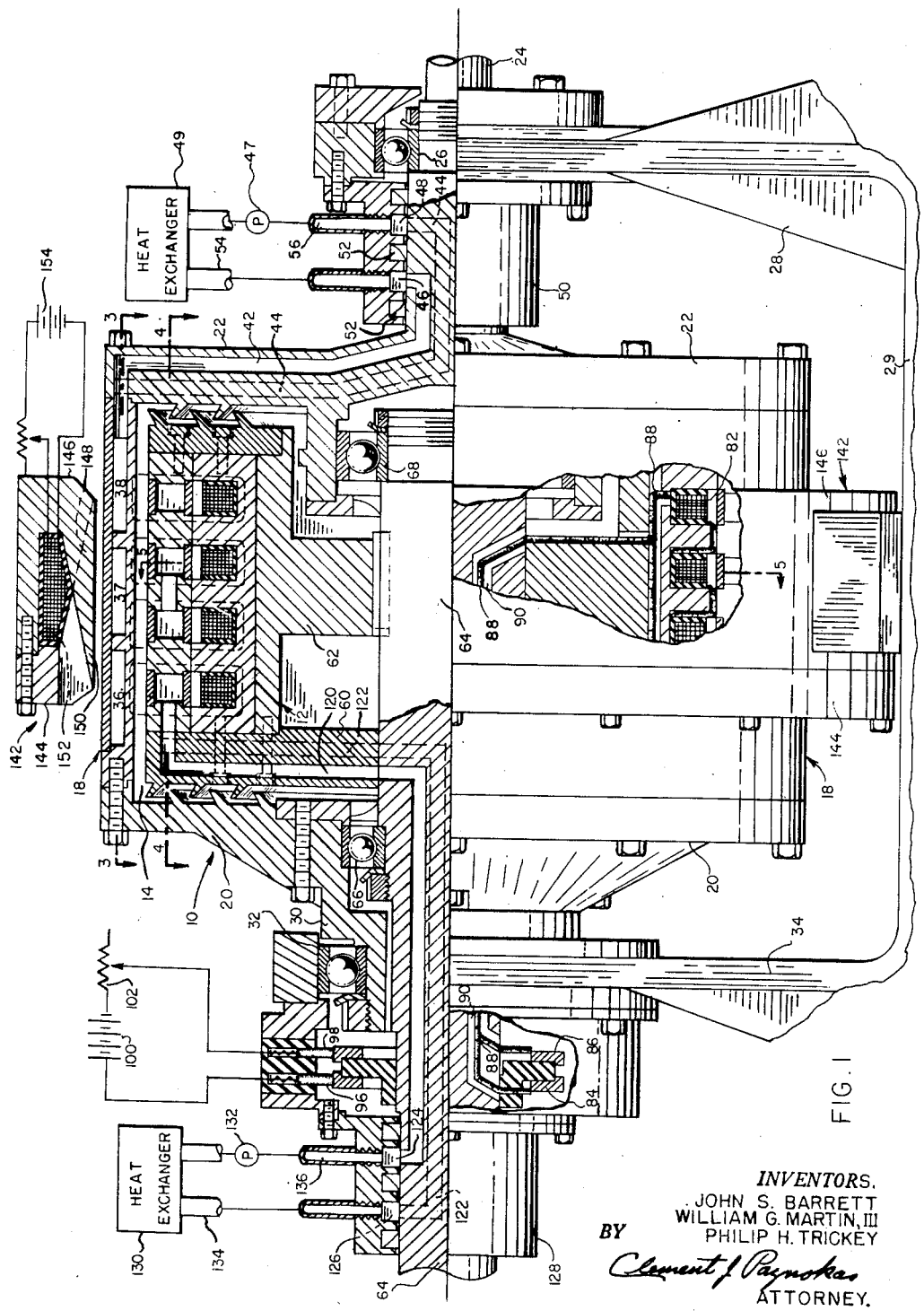
Figure 1 is a view, partly in section, of a preferred embodiment of the invention, the section being taken in the vertical plane containing the axis of the machine.
Figure 2:
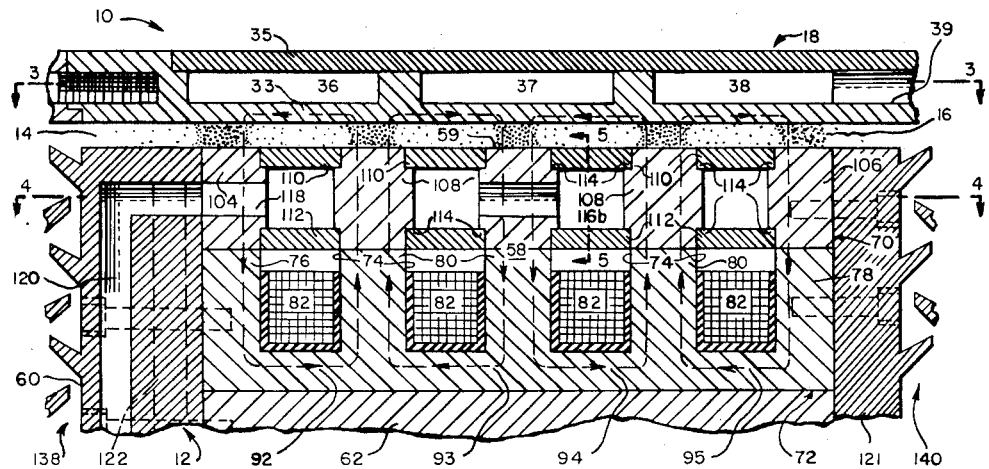
Figure 2 is an enlarged view of a portion of Figure 1.

The preferred form of the invention illustrated in the drawing is a magnetic particle clutch with an outer rotatable coupling member 10 (Figures 1 and 2) spaced from an inner rotatable coupling member 12 to define a magnetic working gap 14 therebetween in which a quantity of magnetic particles 16 are disposed. The inner and outer coupling members are coupled together at will by exciting the gap and magnetic particles with a magnetic field as hereinafter described.

Figure 3:
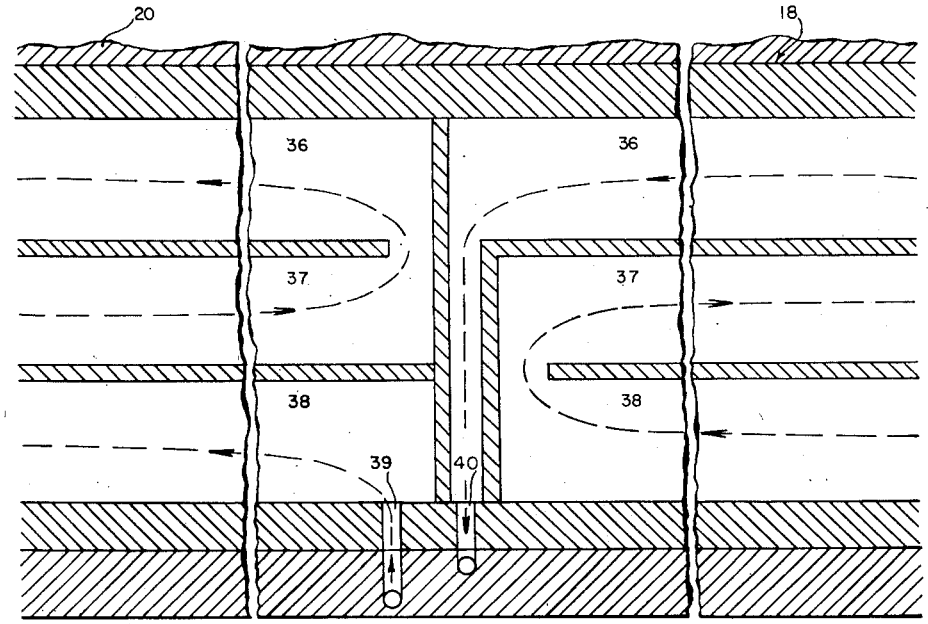
Figure 3 is a section through a developed view of the hollow cylindrical wall of the outer coupling member in the device shown in Figure 1, the section being taken on the line 3—3 of Figures 1 and 2.

The outer coupling member 10 is in the form of a hollow cylindrical casing and includes a magnetic cylinder 18 supported between two circular end shields 20 and 22. End shield 22 is integral with a shaft 24 journalled in a bearing 26 carried by a stationary standard 28, on a frame 29, while the opposite end shield 20 is provided with a hollow hub portion 30 journalled in a bearing 32 carried by a stationary standard 34. For cooling purposes the cylinder 18 is hollow-walled and the space between its inner and outer walls 33 and 35 is divided into a plurality of interconnected compartments 36, 37 and 38. In the preferred embodiment the compartments are arranged in a labyrinthal pattern as shown in the developed view (Figure 3) of the cylinder 18, to provide adequate circulation with the inlet and the outlet to the compartments at the same end of the cylinder as indicated at 39 and 40. The circulation pattern is indicated by the arrows in Figure 3. Passages 42 and 44 formed in and extending through the end shield 22 and shaft 24 connect the inlet 39 and the outlet 40 to the annular inlet and outlet chambers 46 and 48 respectively of a fluid seal member 50 which, together with the shaft 24, forms what is known as a rotating joint or a rotating seal. The chambers 46 and 48 are made fluid tight by a plurality of annular seals 52 retained within annular channels of the member 50 which is secured to the standard 28. Chamber 46 and 48 communicate with a circulating pump 47 and a heat exchanger 49 by means of conduits 54 and 56.

The inner coupling member 12 includes a magnetic cylinder 58 whose outer periphery 59 is spaced from the inner wall 33 of the outer coupling member to define the magnetic working gap 14 therebetween. Cylinder 58 is carried by a circular flange 60 and a spider 62, both fixed to a shaft 64 which extends freely through the hollow hub portion 30 and is journalled in bearings 66 and 68 carried by the end shields 20 and 22 respectively.

In composite form the cylinder 58 comprises a plurality of axially spaced annular magnetic poles having annular channels therebetween, each of which is partially occupied by a magnetizing winding, the rest of the space volume in the channels between the poles being utilized as conduit sections of a continuous labyrinthal passage for circulating a fluid coolant. To effect these purposes in a convenient and economical manner the unique structure disclosed in the drawings is employed.

The cylinder 58 is formed from two concentric cylinders 70 and 72, their constructions being such that they may be fabricated separately and assembled as an integrated cylinder 58 by slidably telescoping one within the other. As a matter of convenience, the cylinder 70 may be termed a "cooling jacket," and cylinder 72 will be referred to as the "coil bobbin." As seen in the drawing, the coil bobbin 72 is a hollow cylinder which has formed therein along its annular periphery a plurality of axially spaced annular channels or grooves 74 defined by circular end flanges 76 and 78 and intervening radial flanges 80. Each of the channels 74 has disposed therein a coil winding 82, all of the coils being connected in series, and to outside slip rings 84 and 86 by electrical leads 88 passing through a bore 90 formed in the shaft 64. The coils are connected in series opposition with respect to their magnetic fields to provide torodial magnetic fields whose circuits in cross section are as indicated for the coils by the dashed line loops 92, 93, 94 and 95 with arrowheads indicating the directions of the respective fields. Electrical energy for the coils 82 is transmitted through brushes 96 and 98 contacting the slip rings 84 and 86 and connected to a source of current such as a battery 100 through a rheostat 102. When current flows through the coils, the flanges 76, 78 and 80 act as magnetic poles and magnetic circuit sections for the flux set up by the energized coils.

The cylindrical cooling jacket 70 is formed from a plurality of axially spaced magnetic rings, which are indicated as end rings 104 and 106, and intermediate rings 108. Closed fluid tight compartments 109 are formed between the magnetic rings by connecting each ring with its adjacent ring or rings with a pair of concentric non-magnetic circular bands 110 and 112 of different diameters. Annular shoulders 114 are provided along the inner and outer diameters of the magnetic rings 104, 106, and 108, in which shoulders the bands 110 and 112 are seated and secured, for mechanical strength and fluid tightness, by any suitable means, for example welding.

It will be noted that when the cylinders 70 and 72 are in assembled relation, the radial flanges 76, 78 and 80 and the magnetic rings 104, 106 and 108 are concentric and contiguous, thus in effect increasing the radial length of the magnetic flanges 76, 78 and 80 which act as poles for the electromagnets formed at each coil station.

Baffles provided in the compartments, and communicating passages formed in the intervening magnetic rings between adjoining compartments, effect a continuous labyrinthine fluid-tight passage with inlet and outlet at the same end of the cooling jacket.

Figure 5:
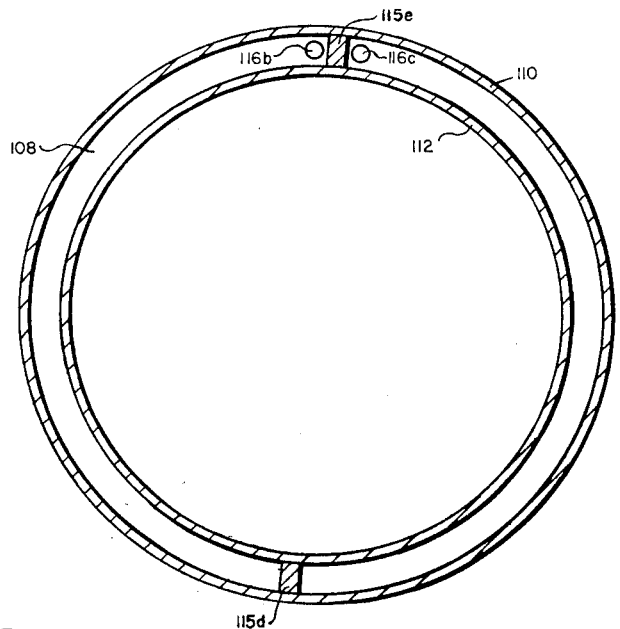
Figure 5 is a sectional view of the inner coupling member's cooling jacket, the section being taken on the line 5—5 of Figures 1, 2 and 4.
Figure 4:
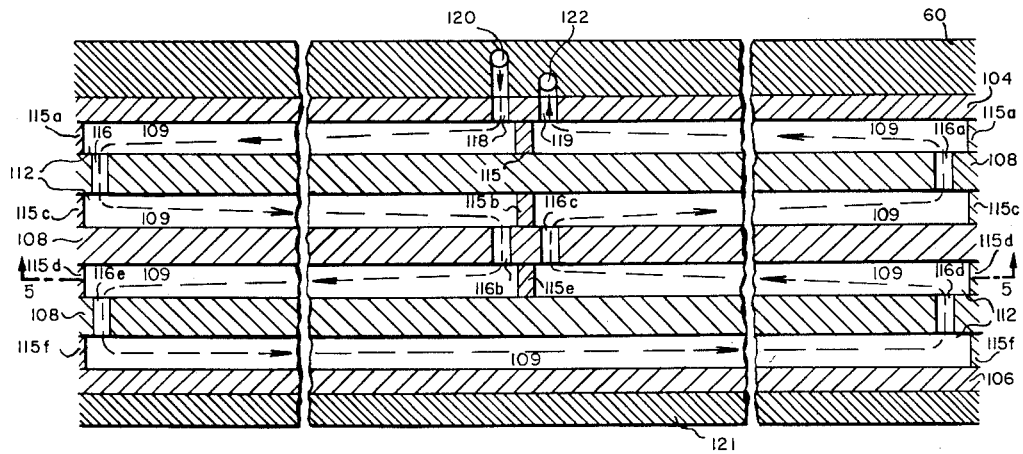
Figure 4 is a section through a developed view of the cylindrical cooling jacket forming the outer periphery of the inner coupling member in the device of Figure 1, the section being taken along the line 4—4 of Figures 1 and 2.

Figures 4 and 5 illustrate the preferred labyrinthal pattern which in practice has proved very successful. Baffles are indicated at 115, 115a, 115b, 115c, 115d, 115e and 115f, and apertures connecting the adjacent compartments are indicated at 116, 116a, 116b, 116c, 116d and 116e. A dashed line with arrowheads in Figure 4 indicates the circulation pattern, which may be described as two opposing or parallel rows of arcuate conduit segments, the segments being connected to form a continuous passage zig-zagging from one end of the cylinder 70 and along one side to the other end, and then zig-zagging back along the other side of the cylinder, thus effecting an inlet 118 and an outlet 119 at the same end.

The cooling jacket 70 and the coil bobbin 72 are both securely fastened to the flange 60, for example by bolts. An end ring 121 bolted to the jacket and bobbin aids in holding the elements of the inner coupling member in their proper relationship.

Passages 120 and 122 formed in and through the flange 60 and the shaft 64 connect the inlet 118 and outlet 119 to the inlet and outlet chambers 124 and 126 of a rotating joint formed between the shaft 64 and a seal housing 128 fixed to the standard 34. A suitable heat exchanger 130 and a circulating pump 132 are connected to the inlet and outlet chambers 124 and 126 of the rotating joint by means of conduits 134 and 136.

Although the inner and outer coupling members may be interchangeably used as either driving or driven members, the outer member for many purposes is preferred as the driven or output member because of the low inertia inherent in the disclosed structure. Coupling between the members 10 and 12 is effected by magnetically exciting the magnetic particles in the magnetic working gap defined by the inner magnetic surface of the outer coupling member and the outer peripheral magnetic surfaces (the magnetic ring surfaces) of the inner coupling member. For example, if the inner member 12 and its shaft 64 are input members and are rotated by a prime mover connected thereto, torque will be transmitted from the member 12 to the member 10 and any load connected to its shaft 24 when the coils 82 are energized to generate magnetic field patterns through the working gap 14 and thereby magnetize the magnetic particles. Interleaved frusto-conical ribs on the inner and outer members 10 and 12 form labyrinth seals at 138 and 140 for preventing migration of magnetic particles beyond the seals.

The cooling system has its greatest utility when the coupling, whether it be as a clutch or a brake, is operated at nonsynchronous speeds, i. e., when torque is transmitted between the members at slip speeds, and power must be dissipated. With the system of the present invention, even as the coupling members are rotating, a continuous circulation of fluid coolant is maintained through the cooling conduits of both inner and outer members along the magnetic working gap where the major part of the heat is generated. The rotating joints or "fluid slip rings" allow circulation of the coolant through the machine and any suitable heat exchanger outside of the machine. Any suitable fluid coolant may be used, however a liquid coolant, for example water, is preferred. With the arrangement disclosed herein it was found that low pressures adequately circulated water as a coolant through the system.

The structure and configuration of the outer coupling member 10 lends itself to use as one of the coupling members of an auxilliary brake when braking or damping of this member is required. For example, the outer cylindrical wall 35 of the member 10 may be employed as an eddy current armature cooperating with a stationary field yoke 142 having a pair of circular bands 144 and 146 each with a plurality of magnetic poles interdigitating axially to provide alternating N and S poles 148 and 150 around the yoke, and energizable with an annular electrical coil 152 disposed between the bands of poles and connected to a suitable source of current such as a battery 154.

While the form of embodiment of the invention as herein disclosed constitutes a preferred form, it is to be understood that other forms might be adopted, all coming within the scope of the claims which follow.

What is claimed is as follows:

1. In a magnetic torque transmitting device having a pair of relatively rotatable magnetic coupling members spaced to define a gap therebetween, the combination with one of said members of means forming a plurality of spaced coaxial annular channels in said member, a magnetizing coil and an arcuate fluid tight conduit segment in each channel, and connections between said conduit segments to form a continuous passage within said member for receiving a fluid coolant.

2. A magnetic torque transmitting device comprising a pair of relatively rotatable coupling members spaced to define a magnetic working gap therebetween, one of said members having a plurality of axially spaced surfaces defining axially spaced annular coaxial channels, each channel being bounded on opposite sides thereof by axially spaced surfaces, magnetizing coils disposed in said channels, and arcuate fluid-tight conduit sections in said channels, said sections being interconnected to form a continuous passage for receiving a fluid coolant.

3. In a torque transmitting device comprising a pair of relatively rotatable cylindrical magnetic coupling members having spaced cylindrical magnetic surfaces defining a gap between said members, the combination with one of said members of a plurality of axially spaced annular flanges on said member defining a plurality of channels between the flanges, said channels having axially spaced sides, a magnetizing coil disposed in each channel, and arcuate segment means in each channel, the edges of said segment means forming fluid tight joints with said channel sides, said segment means and said channel sides defining a fluid tight compartment having an arcuate configuration, the compartments being interconnected to form a continuous zig-zag shaped passage for receiving a fluid coolant.

4. A magnetic force transmitting device comprising first and second separate magnetic members, an intermediate magnetic member disposed between the first and second members and spaced therefrom to form magnetic gaps between said intermediate and the first member and between the intermediate and the second member, said members being relatively rotatable with respect to each other, said intermediate member having a compartment therein for receiving a fluid coolant and means coupled to said compartment including a rotating fluid joint for circulating coolant through the compartment.

5. A magnetic force transmitting device comprising first and second spaced magnetic members, an intermediate magnetic member disposed between said spaced members, said members being relatively rotatable with respect to each other, said intermediate member having walls defining a hollow compartment for receiving a fluid coolant, first and second walls respectively on opposite sides of said compartment having magnetic coupling surfaces facing away from each other, the coupling surface of the first wall facing the first magnetic member, and the coupling surface of the second wall facing the second magnetic member.

6. In a magnetic coupling device such as a brake, clutch, or the like, a cylindrical magnetic coupling member comprising a preformed cylindrical coil bobbin and a separately preformed cylindrical cooling jacket, the bobbin having a plurality of axially spaced annular magnetic flanges defining channels therebetween, and a control coil disposed in each channel, the cooling jacket being a hollow cylinder with a hollow wall having a plurality of axially spaced magnetic rings dividing the wall into a plurality of arcuate fluid conduit sections, said bobbin and jacket being assembled one within the other in fixed relation, and each of said rings being concentric with a separate one of said flanges.

7. In a magnetic field responsive torque transmitting device having a pair of relatively rotatable cylindrical magnetic coupling members, the combination with one of said members of means within the member defining a plurality of spaced annular channels, an annular magnetic field coil and an arcuate fluid-tight conduit segment in each channel, said coil and said segment being concentric, means interconnecting said segments in series to form a continuous passage for receiving fluid coolant, and means coupled to said passage including a rotating fluid joint for circulating coolant through said passage.

8. In a magnetic torque transmitting device such as a brake, clutch or the like, having a pair of relatively rotatable coupling members, the combination with one of said members of a magnetic portion having a plurality of coaxial annular radial axially spaced ribs defining a plurality of annular channels, an annular control coil in each channel, and an arcuate conduit segment in each channel, said segments being connected in series to provide a continuous fluid-tight passage for receiving a coolant.

9. In a magnetic torque transmitting device, such as a brake, clutch or the like, having a pair of relatively rotatable coupling members, the combination with one of said members of a magnetic portion having therein a plurality of axially spaced arcuate conduit segments and a plurality of axially spaced annular control coils, a nonmagnetic radial spacing means between each conduit segment and a separate one of said coils, means connecting said segments in series, and means coupled to said segments including a rotating joint for circulating a coolant therethrough.

10. In a magnetic torque transmitting device having a pair of cylindrical relatively rotatable magnetic coupling members spaced to define a gap therebetween, the combination with one of said members of means forming within the member a plurality of axially spaced arcuate conduit sections connected in series to form a continuous passage with a zig-zag pattern, said means comprising a plurality of axially spaced radially extending arcuate elements forming sides of the conduit sections, each of said elements being common to adjacent annular spaced conduit sections, radially spaced circular means forming radially spaced walls of said conduit sections, circumferentially spaced baffle means forming the ends of each conduit section, and means including at least parts of said radially extending elements defining axial passageways connecting adjoining conduit sections, all of said sections being connected in series for receiving a fluid coolant.

11. In a magnetic torque transmitting device having a pair of cylindrical relatively rotatable magnetic coupling members spaced to define a gap therebetween, the combination with one of said members of means forming within the member a plurality of coextensive axial rows of axially spaced arcuate conduit sections, the sections in each row being connected in series in a zig-zag pattern, all the rows being connected in series to form a continuous passageway for the reception of a fluid coolant, said means comprising a plurality of axially spaced radially extending arcuate elements forming sides of the conduit sections, each of said elements being common to adjacent axially spaced conduit sections, radially spaced circular means forming radially spaced walls of said conduit sections, circumferentially spaced baffle means forming the ends of each conduit section, and means including at least parts of said radially extending elements defining axial passageways connecting adjoining conduit sections, all of said sections being connected in series for receiving the coolant, said continuous passageway having an inlet communicating with a conduit section at one end of one of said rows and an outlet communicating with a conduit section at the same end of another of said rows.

12. In a magnetic torque transmitting device having a pair of cylindrical relatively rotatable magnetic coupling members spaced to define a gap therebetween, the combination with one of said members of means forming a plurality of axially spaced annular channels in said one member, said means comprising a plurality of axially spaced radially extending annular magnetic elements on said one member forming axially spaced sides of said channels, each channel having therein a magnetizing coil and arcuate nonmagnetic element means, and means in each channel including said element means and said axially spaced sides of the channel defining an arcuate conduit adapted to carry a fluid coolant, said conduits being interconnected to form a continuous passage for receiving the fluid coolant.

13. In a magnetic particle torque transmitting device comprising a pair of relatively rotatable magnetic coupling members spaced to define a gap therebetween and with magnetic particles in said gap, the combination with one of said members of means forming a plurality of spaced coaxial annular channels in said member, a magnetizing coil and an arcuate fluid tight conduit segment in each channel, and connections between said conduit segments to form a continuous passage within said member for receiving a fluid coolant.

References Cited in the file of this patent

UNITED STATES PATENTS

| | | |
|---|---|---|
| 1,424,097 | Herman | July 25, 1922 |
| 1,448,700 | Seidner | Mar. 13, 1923 |
| 1,985,291 | Hodges | Dec. 25, 1934 |
| 2,073,926 | Fraser | Mar. 16, 1937 |
| 2,197,990 | Winther | Apr. 23, 1940 |
| 2,263,961 | Wilson | Nov. 25, 1941 |
| 2,294,207 | Roberts | Aug. 25, 1942 |
| 2,306,582 | Winther et al. | Dec. 29, 1942 |
| 2,334,976 | Winther | Nov. 23, 1943 |
| 2,351,963 | Hayes | June 20, 1944 |
| 2,386,701 | Martin | Oct. 9, 1945 |
| 2,407,043 | Tremolada | Sept. 3, 1946 |
| 2,541,227 | Findley | Feb. 13, 1951 |
| 2,604,198 | Stephenson | July 22, 1952 |
| 2,672,550 | Vaughan | Mar. 16, 1954 |

FOREIGN PATENTS

| | | |
|---|---|---|
| 37,816 | Austria | July 10, 1909 |
| 114,753 | Austria | Oct. 25, 1929 |